Figure 1:
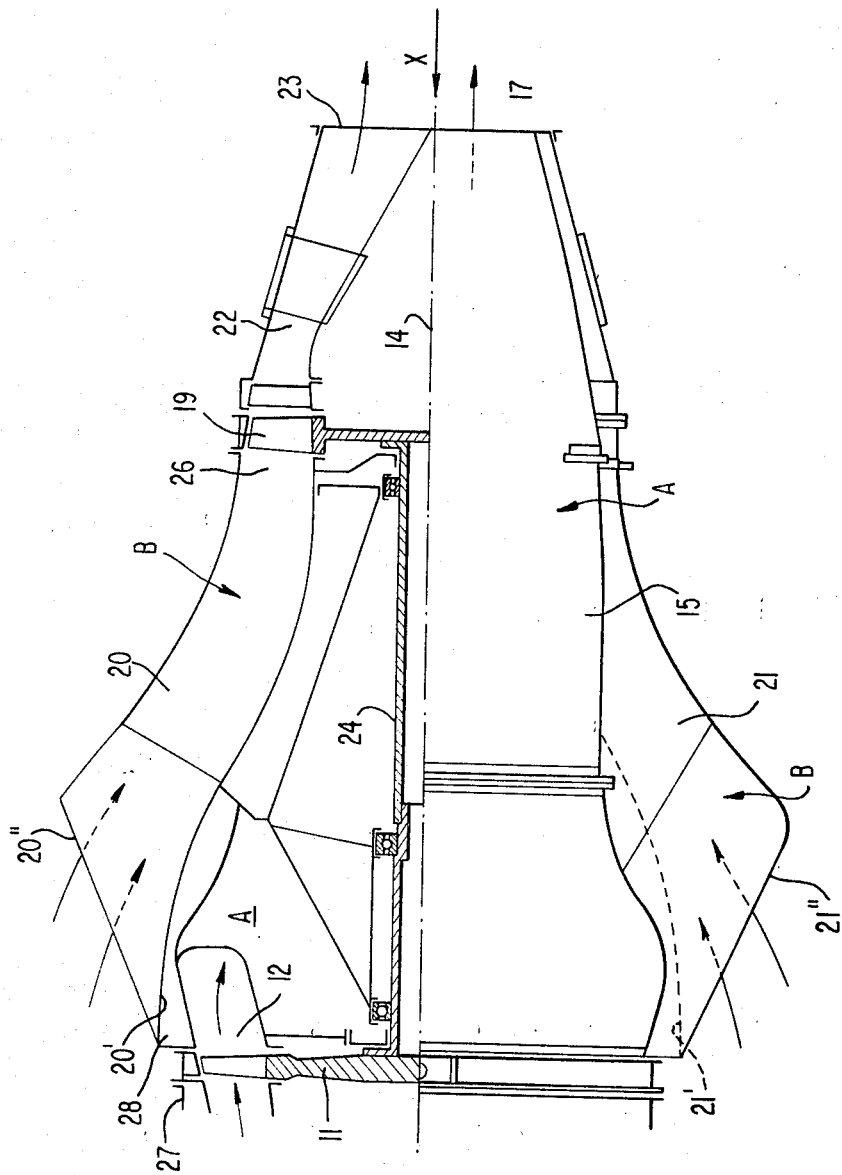

July 30, 1968 H. J. GRIEB 3,394,548
TWO-STAGE TURBINE UNIT
Filed Sept. 2, 1965 2 Sheets-Sheet 1

INVENTOR
HUBERT J. GRIEB
BY Dicke & Craig
ATTORNEYS

United States Patent Office 3,394,548
Patented July 30, 1968

3,394,548
TWO-STAGE TURBINE UNIT
Hubert J. Grieb, Stuttgart-Botnang, Germany, assignor to Daimler-Benz Aktiengesellschaft, Stuttgart-Unterturkheim, Germany
Filed Sept. 2, 1965, Ser. No. 484,672
Claims priority, application Germany, Sept. 5, 1964, D 45,358
15 Claims. (Cl. 60—226)

The present invention relates to a two-stage gas turbine jet drive unit, especially for the propulsion of airplanes, comprising a first propulsion unit stage consisting of one or several compressors, of one or several combustion chambers, of one or several compressor-drive turbines and possibly of one or several output or utilization load turbines mechanically separate from the compressor-drive turbines, and of two thrust pipes or conduits provided with thrust nozzles arranged symmetrically to the vertical longitudinal center plane of the drive unit and extending, separate from one another, downstream of the annularly shaped turbine discharge, and a second propulsion unit stage which is formed by a thrust compressor driven from a turbine of the first propulsion unit stage by way of a shaft, which thrust compressor is arranged to the rear or downstream of the turbines coaxially with respect thereto, the thrust compressor drawing in air and compressing the same by way of two separate inlet channels or ducts that are combined into an annularly shaped inlet in front of the thrust compressor, and in which the thus compressed air is discharged through a thrust pipe or conduit provided with a thrust nozzle which is arranged concentrically to the longitudinal axis of the drive unit.

In two-stage gas-turbine jet propulsion units having the construction described above, the air scoop or admission for the second propulsion unit stage takes place by way of two air inlet channels disposed mirror-image-like on both sides of the vertical longitudinal center plane of the drive unit within the upper region thereof outside of the drive unit casing, with the air inlet apertures of these air inlet channels located approximately at the height, i.e., at the axial location of the output turbine over the wing roots of the airplane. The combining of the two separate air inlet channels takes place ahead of the thrust compressor by means of channel walls leading in part obliquely in the downward and lateral directions to the annularly shaped thrust compressor inlet whereby the drive shaft extending between the output or utilization turbine and the thrust compressor extends through these channel walls. The upwardly disposed arrangement of the air inlet channels and the arrangement of the channel walls extending in part obliquely downwardly toward the lower area of the annularly shaped thrust compressor inlet results in a guidance of the inflowing air unfavorable from a streamlining point of view and in an uneven loading of the guide blade ring for the thrust compressor rotor which, in turn, causes efficiency losses. In order to keep the latter as slight as possible, a guide ring is necessary, matched to the different discharge directions as viewed over the circumference thereof which, however, leads to an expensive construction. A further disadvantage of the known propulsion unit construction consists in that also the discharge of the hot gases leaving the output or utilization turbine takes place in a similar manner, namely, in such a manner that the annularly shaped turbine discharge branches out into two separate thrust pipes directed obliquely downwardly whose thrust nozzles are also arranged on both sides of the vertical propulsion unit longitudinal center plane, but within the lower region of the propulsion unit outside of the propulsion unit casing at the height, i.e., at the axial location of the thrust compressor. This type of gas discharge downstream of the last turbine also entails a reduction in efficiency and requires in addition an aft-guide-ring matched to the different discharge directions as viewed over the circumference thereof.

Furthermore, aft-fan propulsion units constructed as casing-flow propulsion units are known having compressor blades mounted on the turbine blades with the interposition of an intermediate blade ring which compressor blades draw in the air out of the atmosphere and supply the same through a flow channel extending coaxially to the turbine channel, and in which a second thrust nozzle is provided at the end of the flow channel disposed concentrically about the thrust nozzle of the first hot propulsion unit stage. This construction of a two-stage gas turbine jet propulsion unit has a relatively large frontal end surface and is disadvantageous because it causes difficulties to bring into harmony in an optimum manner the aerodynamic requirements of the turbine and of the thrust compressor which rotates at the same rotational speed but at different circumferential speeds. Additionally, the manufacture of the "two-story" bladed turbine-aft fan wheel is complicated and expensive. The present invention does not relate to such a propulsion unit concept, but rather is concerned with a propulsion unit equipment of the type mentioned first, and more particularly with a thrust compressor arranged at a distance to the rear of the turbine or turbines and coaxially with respect thereto, which thrust compressor is driven by way of a shaft from a compressor-drive turbine or preferably from an output turbine mechanically separate from the compressor-drive turbine, with the basic advantage of separate rotors for the drive turbine and the thrust compressor.

The present invention aims at avoiding the disadvantage and difficulties normally encountered with the so-called aft-fan propulsion units.

As solution to the underlying problems, it is proposed with a two-stage gas turbine jet propulsion unit of the first-mentioned type to arrange both the two air inlet channels of the second propulsion unit stage as well as the two thrust pipes of the first propulsion unit stage diametrically opposite each other and eccentrically to the propulsion unit longitudinal axis and to displace the two air inlet channels by 90 degrees to the two thrust pipes.

The air guidance of the second propulsion unit stage from the two air inlet apertures to the central thrust nozzles, on the one hand, and the propulsion gas guidance of the first propulsion unit stage from the turbine (utilization load turbine) driving the thrust compressor to the thrust nozzles of the two thrust pipes, on the other, represent according to the present invention, two "pants-like" pipes, so to speak of, mutually displaced by 90 degrees and directed mutually toward each other, which are nested one within the other in a space-saving manner and thereby offer little additional end face or frontal resistance as compared to a single stage propulsion unit so that an aerodynamically favorable and slender external configuration for the propulsion unit may be achieved by the present invention. Furthermore, the present invention creates at the same time aerodynamically good conditions as regards air inflow from the outside and a shock-free air inlet into the thrust compressor as well as the discharge of the hot gases from the drive turbine.

Accordingly, it is an object of the present invention to provide a two-stage jet propulsion unit of the type described above which eliminates by simple means the shortcomings and drawbacks encountered with the prior art constructions.

Another object of the present invention resides in the provision of a two-stage gas turbine jet propulsion unit which assures a conduction of the inflowing air that is favorable from a stream-lining point of view as well as a uniform loading of the guide blade ring of the thrust compressor.

A further object of the present invention resides in the provision of a two-stage propulsion unit of the type described above which produces a high efficiency in the operation thereof, yet is relatively inexpensive in manufacture and construction and obviates the need for expensive and costly guide blade ring or rings.

Still another object of the present invention resides in the provision of a two-stage gas turbine drive unit which offers little more flow resistance by the front end surface thereof than would be the case with a single stage propulsion unit.

A still further object of the present invention resides in the provision of a two-stage gas turbine jet propulsion unit which achieves the aforementioned objects yet eliminates those drawbacks which are inherent in the aft-fan propulsion units.

Another object of the present invention is the provision of a two-stage gas turbine propulsion unit which requires relatively little space and permits a stream-lining of the external configuration of the propulsion unit.

Figure 2:
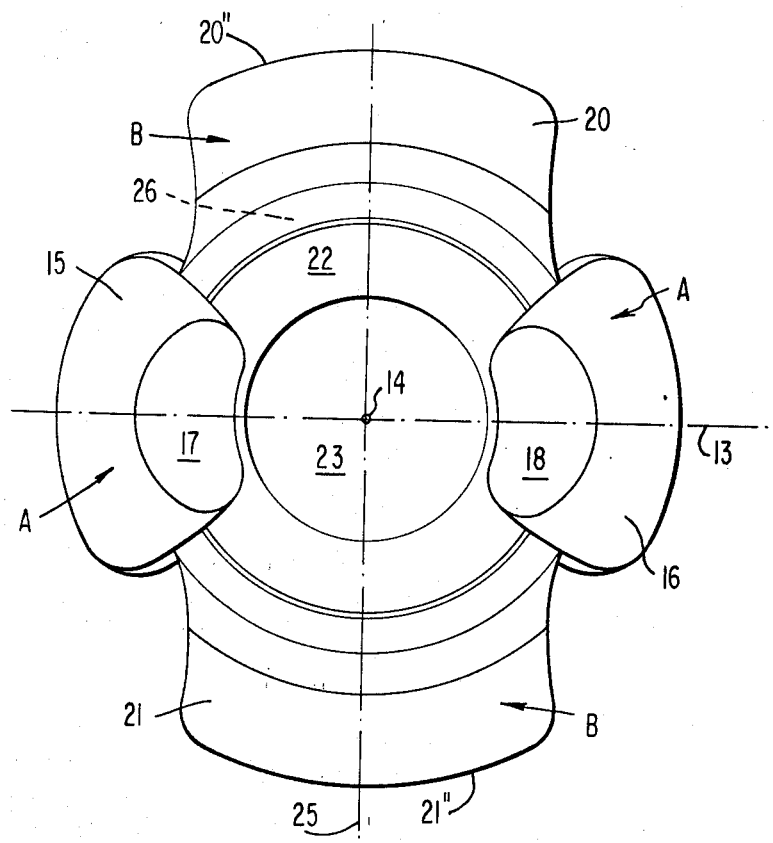

These and further objects, features and advantages of the present invention will become more obvious from the following description when taken in connection with the accompanying drawing, which shows, for purposes of illustration only, one embodiment in accordance with the present invention, and wherein:

FIGURE 1 is a side elevational view of the rear section of a two-stage gas turbine jet propulsion unit in accordance with the present invention, with the upper half thereof in cross section, and FIGURE 2 is a rear end elevational view of the two-stage gas turbine pet propulsion unit of FIGURE 1, taken in the direction of the arrow X in FIGURE 1.

Referring now to the drawing, wherein like reference numerals are used throughout the two views to designate like parts, the two-stage gas turbine jet propulsion unit consists of a first propulsion unit stage generally designated by reference character A and of a second propulsion unit stage generally designated by reference character B. The latter is illustrated completely in the drawing whereas of the first stage A, only the turbine 11 forming an output or useful load turbine is shown, which includes an annularly shaped turbine discharge 12 that, in turn, is branched off and splits into two thrust pipes 15 and 16 having thrust nozzles 17 and 18 which extend in the horizontal longitudinal center plane 13 eccentrically to the propulsion unit longitudinal axis 14.

The second propulsion unit stage B comprises a thrust compressor 19 driven by the turbine 11 by way of a shaft 24. The compressor 19 is supplied with air by way of two inlet channels 20 and 21 extending above and below the propulsion unit and disposed in the vertical longitudinal center plane 25, which inlet channel 20 and 21 combine ahead or upstream of the thrust compressor 19 into an annularly shaped compressor inlet 26. The air thus supplied through the inlet charnnels 20 and 21 is compressed by the thrust compressor 19 and is discharged through a discharge pipe 22 extending concentrically to the propulsion unit longitudinal axis 14 and provided with a thrust nozzle 23 with the attendant production of a thrust output.

The two air inlet channels 20 and 21 as well as the central thrust pipe 22 provided with the thrust nozzle 23, on the one hand, which together form the air guidance for the second propulsion unit stage B, and the turbine discharge 12 as well as the two thrust pipes 15 and 16 provided with the thrust nozzles 17 and 18 thereof, on the other, which together form the guidance for the hot gases leaving the drive turbine 11, represent two "pant-like" pipes, so to speak of, mutually displaced by 90 degrees and directed toward one another which are arranged nested one within the other in a space-saving manner.

A free air gap 28 remains between the wall parts 20' and 21' of the air inlet channels 20 and 21 facing the propulsion unit external casing walls 27 on the one hand, and the propulsion unit external casing walls 27, on the other, in order to by-pass and keep the boundary layer stream out of the air inlet of the second propulsion unit stage B. The air collecting funnels 20" and 21" of the air inlet channels 20 and 21 are directed obliquely and downwardly, toward the rear, whereby the air inlet conditions, especially at higher mach numbers are improved and at the same time the end surface of the propulsion unit is reduced. As can be seen from FIG. 2, the two thrust pipes 15 and 16 extending laterally of the central thrust pipe 22 of the second propulsion unit stage B and the thrust nozzle 17 and 18 thereof are constructed reniform shaped in cross-section and thereby closely follow and hug with their drawn-in surfaces the curvature of the central thrust pipe 22 which produces a spatially favorable arrangement.

The air inlet channels 20 and 21 are constructed as one-sided inclined impact diffusors, while the thrust compressor is preferably constructed as transonic stage.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. In combination with a double-stage gas turbine jet power plant, especially for the propulsion of aircraft, with a first power plant stage having at least one compressor, at least one combustion chamber, at least one compressor-driving turbine, only two separate thrust ducts each having a discharge nozzle and extending from and connected to an annular turbine exit, and with a second power plant stage having a thrust blower that is driven through a shaft by a turbine of the first power plant stage and is arranged in back of and coaxially to said turbines for drawing in and compressing air through two separate intake ducts which unite in front of the stage to form an annular air entry pipe for conducting the gas out through a single central propulsive duct having a discharge nozzle arranged concentrically to the longitudinal axis of the power plant, the improvement comprising: said two air inlet ducts of the second power plant stage being diametrically symmetrical and aligned; said two thrust ducts of the first power plant stage and said two discharge nozzles of the first power plant stage being diametrically symmetrical and aligned with their diametric line of symmetry being substantially perpendicular to the diametric line of symmetry of said two air inlet ducts of the second power plant stage; said thrust ducts and said discharge nozzles of said first power plant stage having a nodular profile and being mounted along the sides of and partially enveloping said central propulsive duct of the second power plant stage and being coupled to it by shape.

2. The double-stage gas turbine jet power plant according to claim 1, wherein said discharge nozzles of the first power plant stage and said discharge nozzle of the second power plant stage are substantially symmetrical about a single plane that is horizontal in the normal position of the power plant so that said discharge nozzle of said stages are arranged at equal height at the end of the power plant.

3. The double-stage gas turbine jet power plant according to claim 2, wherein, relative to the normal position of the power plant when installed in an aircraft, said two air inlet ducts of the second power plant stage lead into said thrust blower and extend substantially symmetrical with respect to the vertical median longitudinal plane of the power plant and said thrust ducts of the first power plant stage are substantially symmetrical with respect to the horizontal median longitudinal plane of the power plant.

4. The double-stage gas turbine jet power plant according to claim 2, wherein said two air inlet ducts of the second power plant stage have a forward peripheral inlet edge with a flat profile.

5. The double-stage gas turbine jet power plant according to claim 4, wherein said thrust blower of the second power plant stage is a "trans-sonic" stage.

6. The double-stage gas turbine jet power plant according to claim 1, wherein, relative to the normal position of the power plant when installed in an aircraft, said two air inlet ducts of the second power plant stage lead into said thrust blower and extend substantially symmetrical with respect to the vertical median longitudinal plane of the power plant and said thrust ducts of the first power plant stage are substantially symmetrical with respect to the horizontal median longitudinal plane of the power plant.

7. The double-stage gas turbine jet power plant according to claim 1, wherein, relative to the normal position of the power plant when installed in an aircraft, said two air inlet ducts of the second power plant stage lead into said thrust blower and extend substantially symmetrical with respect to the vertical median longitudinal plane of the power plant and said thrust ducts of the first power plant stage are substantially symmetrical with respect to the horizontal median longitudinal plane of the power plant.

8. The double-stage gas turbine jet power plant according to claim 7, wherein said two air inlet ducts of the second power plant stage have a forward peripheral inlet edge with a flat profile.

9. The double-stage gas turbine jet power plant according to claim 8, wherein said thrust blower of the second power plant stage is a "trans-sonic" stage.

10. The double-stage gas turbine jet power plant according to claim 1, wherein said two air inlet ducts of the second power plant stage have a forward peripheral inlet edge with a flat profile.

11. The double-stage gas turbine jet power plant according to claim 10, wherein said thrust blower of the second power plant stage is a "trans-sonic" stage.

12. The double-stage gas turbine jet power plant according to claim 2, wherein said two air inlet ducts of the second power plant stage have a forward peripheral inlet edge with a flat profile.

13. The double-stage gas turbine jet power plant according to claim 2, wherein said thrust blower of the second power plant stage is a "trans-sonic" stage.

14. The double-stage gas turbine jet power plant according to claim 7, wherein said thrust blower of the second power plant stage is a "trans-sonic" stage.

15. The double-stage gas turbine jet power plant according to claim 1, wherein said thrust blower of the second power plant stage is a "trans-sonic" stage.

References Cited

UNITED STATES PATENTS

| | | | |
|---|---|---|---|
| 2,503,973 | 4/1950 | Smith | 244—53.8 |
| 2,920,843 | 1/1960 | Ferri | 60—224 |
| 2,930,190 | 3/1960 | Rogers | 60—226 |
| 2,989,843 | 6/1961 | Ferri | 60—226 |
| 3,063,661 | 11/1962 | Smith | 60—226 |
| 3,163,379 | 12/1964 | McLafferty | 244—53.8 |

FOREIGN PATENTS

| | | |
|---|---|---|
| 1,006,022 | 1/1952 | France. |
| 1,239,218 | 7/1960 | France. |
| 1,325,278 | 3/1963 | France. |

MARTIN P. SCHWADRON, *Primary Examiner.*

MARK M. NEWMAN, *Examiner.*

D. HART, *Assistant Examiner.*